United States Patent
Park

(10) Patent No.: US 11,451,183 B2
(45) Date of Patent: Sep. 20, 2022

(54) APPARATUS AND METHOD FOR DETECTING BLDC MOTOR OVERLOAD

(71) Applicants: HYUNDAI MOTOR COMPANY, Seoul (KR); KIA MOTORS CORPORATION, Seoul (KR)

(72) Inventor: Choong Seob Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 624 days.

(21) Appl. No.: 16/447,109

(22) Filed: Jun. 20, 2019

(65) Prior Publication Data

US 2020/0169213 A1 May 28, 2020

(30) Foreign Application Priority Data

Nov. 22, 2018 (KR) .................. 10-2018-0145097

(51) Int. Cl.
| | |
|---|---|
| *H02P 29/024* | (2016.01) |
| *H02P 25/02* | (2016.01) |
| *H02P 9/10* | (2006.01) |
| *H02P 9/00* | (2006.01) |
| *H02K 7/08* | (2006.01) |
| *H02K 7/14* | (2006.01) |

(52) U.S. Cl.
CPC .......... *H02P 29/024* (2013.01); *H02K 7/085* (2013.01); *H02K 7/14* (2013.01); *H02P 9/006* (2013.01); *H02P 9/107* (2013.01); *H02P 25/02* (2013.01)

(58) Field of Classification Search
USPC ..................................... 318/400.21
See application file for complete search history.

(56) References Cited

U.S. PATENT DOCUMENTS

| | | | | |
|---|---|---|---|---|
| 2004/0257027 | A1* | 12/2004 | Matsuo | H02P 21/26 318/722 |
| 2010/0194325 | A1* | 8/2010 | Dixon | H02P 21/18 318/490 |
| 2013/0334995 | A1* | 12/2013 | Kuroda | H02P 27/06 318/400.27 |

* cited by examiner

*Primary Examiner* — Kawing Chan
(74) *Attorney, Agent, or Firm* — McDonnell Boehnen Hulbert & Berghoff LLP

(57) ABSTRACT

The present disclosure provides a brushless direct current (BLDC) motor overload detection apparatus. The BLDC motor overload detection apparatus includes a measurer for measuring an electrical angle of the BLDC motor, a determiner for determining whether a difference between the electrical angle measured by the measurer and a mechanical angle of the BLDC motor, estimated through current supplied to the BLDC motor, is within a predetermined range, and a driving controller for control of driving of the BLDC motor according to whether the BLDC motor stalls, determined by the determiner.

13 Claims, 4 Drawing Sheets

APPARATUS AND METHOD FOR DETECTING BLDC MOTOR OVERLOAD

CROSS REFERENCE TO RELATED APPLICATION

This application claims under 35 U.S.C. § 119(a) the benefit of priority to Korean Patent Application No. 10-2018-0145097 filed on Nov. 22, 2018, the entire contents of which are incorporated herein by reference.

BACKGROUND

(a) Technical Field

The present disclosure relates to an apparatus and method for detecting overload of a brushless direct current (BLDC) motor, for measuring a difference between a mechanical angle and an electrical angle of the BLDC motor to determine whether the BLDC motor stalls.

(b) Background Art

A brushless direct current (BLDC) motor is created by removing a brush, functioning as a commutator, from a general direct current (DC) motor while maintaining the properties of the DC motor. The BLDC motor is configured to include a stator including three-phase coils (U-phase coil, V-phase coil, and W-phase coil) and a rotor including a permanent magnet.

The BLDC motor is configured to allow current to flow in each phase of a coil at a stator side of a 3-phase BLDC motor and to generate a magnetic field in a coil by the current to rotate the rotor. In this case, the BLDC motor sequentially turns on and off switching devices for detecting the intensity of a magnetic field of the rotor and switching the direction of current flowing in each phase of a coil depending on the detected intensity of the magnetic field to continuously rotate the rotor in one direction. In general, to measure the position of a rotor, a method using a rotor position detection sensor device (a hall sensor, an encoder, etc.), a sensorless method using a back electro motive force (BEMF) method, or a sensorless method using vector control is used.

However, when a position detection sensor device is used, the cost of a device for detection of overload of a BLDC motor is increased. In addition, in the sensorless method using vector control, even if a BLDC motor stalls, current continuously flows in the BLDC motor, and thus it is difficult to accurately detect stalling of the BLDC motor.

SUMMARY

In one aspect, the present disclosure provides an apparatus and method for detecting overload of a brushless direct current (BLDC) motor, for determining whether the BLDC motor stalls, using a regulator angle without a separate rotor position detection sensor.

In a preferred embodiment, an apparatus for detecting overload of a brushless direct current (BLDC) motor includes a measurer for measuring an electrical angle of the BLDC motor, a determiner for determining whether a difference between the electrical angle measured by the measurer and a mechanical angle of the BLDC motor, estimated through current supplied to the BLDC motor, is within a predetermined range, and a driving controller for control of driving of the BLDC motor according to whether the BLDC motor stalls, determined by the determiner.

In another preferred embodiment, the determiner may determine that an error occurs in the BLDC motor when the difference between the electrical angle and the mechanical angle is out of the predetermined range.

In still another preferred embodiment, the determiner may determine that the BLDC motor stalls when a value obtained by adding the number of times an error occurs to an initialization value is greater than a predetermined threshold value.

In yet another preferred embodiment, when an error occurs in the BLDC motor, the determiner may count the number of times an error occurs, and when a value obtained by adding the number of times an error occurs to an initialization value is equal to or less than a predetermined threshold value, the determiner may repeatedly determine whether the difference between the electrical angle and the mechanical angle is out of the predetermined range.

In still yet another preferred embodiment, the determiner may subtract the number of times an error occurs, corresponding to a predetermined number, from the initialization value when error does not occur in the BLDC motor.

In a further preferred embodiment, when the determiner determines that the BLDC motor stalls, the driving controller may control a velocity value of the BLDC motor to 0.

In another further preferred embodiment, the predetermined range may be set based on 90 degrees, when the BLDC motor is in a normal condition, the difference between the electrical angle and the mechanical angle may be maintained at 90 degrees, and when the BLDC motor is in a stall condition, the difference between the electrical angle and the mechanical angle may be out of the predetermined range.

In another aspect, the present disclosure provides a method of detecting overload of a brushless direct current (BLDC) motor, the method including deriving a mechanical angle of the BLDC motor from a current value supplied to the BLDC motor, measuring an electrical angle of the BLDC motor, determining whether a difference between the mechanical angle and the electrical angle is within a predetermined range, counting the number of times error, in which the difference between the mechanical angle and the electrical angle is out of the predetermined range, occurs, and determining whether the BLDC motor stalls based on the number of times an error occurs.

In another preferred embodiment, the determining whether the BLDC motor stalls based on the number of times an error occurs may include determining that the BLDC motor stalls when the number of times an error occurs is equal to or greater than a predetermined threshold value.

In still another preferred embodiment, the determining whether the difference between the mechanical angle and the electrical angle is within the predetermined range may include determining that the BLDC motor is in a normal condition when the difference between the mechanical angle and the electrical angle is within the predetermined range, and determining that the BLDC motor is in a stall condition when the difference between the mechanical angle and the electrical angle is out of the predetermined range.

In yet another preferred embodiment, the counting of the number of times an error, in which the difference between the mechanical angle and the electrical angle is out of the predetermined range, occurs may include subtracting the number of times an error occurs, corresponding to a predetermined number, from a previous error value when the BLDC motor is in the normal condition, and adding the number of times an error occurs, corresponding to the predetermined number, to the previous error value when the BLDC motor is in the stall condition.

In still yet another preferred embodiment, the determining whether the BLDC motor stalls based on the number of times an error occurs may include determining whether a current error value obtained by adding or subtracting the number of times an error occurs corresponding to a predetermined number to or from the previous error value is equal to or greater than a predetermined threshold value.

In a further preferred embodiment, the method may further include repeatedly measuring whether the difference between the electrical angle and the mechanical angle is out of the predetermined range when the current error value is equal to or less than a predetermined threshold value.

In another further preferred embodiment, the method may further include controlling a velocity of the BLDC motor to 0 upon determining that the BLDC motor stalls based on the number of times an error occurs.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
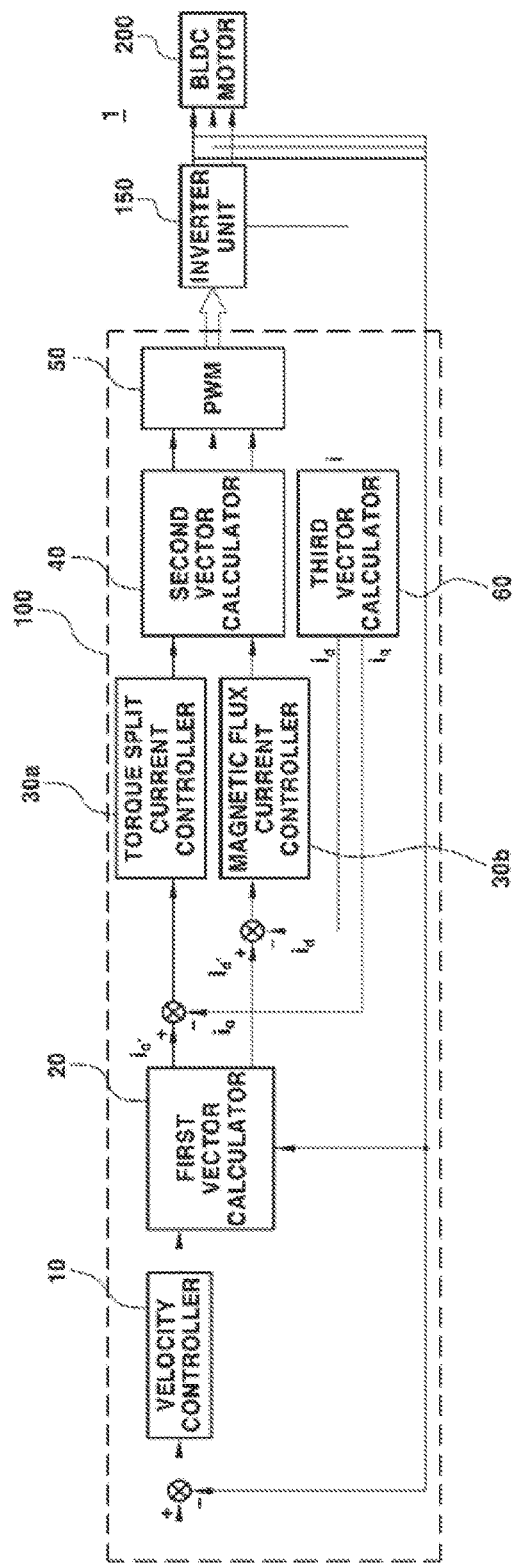
FIG. 1 is a diagram showing a sensorless vector control system according to an exemplary embodiment of the present disclosure.

The attached drawings for illustrating exemplary embodiments of the present disclosure are referred to in order to gain a sufficient understanding of the present disclosure, the merits thereof, and the objectives accomplished by the implementation of the present disclosure. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. Meanwhile, the terminology used herein is for the purpose of describing particular embodiments and is not intended to limit the disclosure. Like reference numerals in the drawings denote like elements.

Further, the terms such as in the drawings denote like eled in the specification mean units for processing at least one function or operation, which may be implemented by hardware, software, or a combination thereof.

Additionally, the terms such as first and second used to describe the components of the present disclosure are solely for the purpose of differentiating one component from another, and the present disclosure is not limited to the order in the following description.

The detailed description of the present disclosure is for the purpose of exemplifying the present disclosure. In addition, the detailed description of the present disclosure is described with regard to exemplary embodiments of the present disclosure and the present disclosure can be used in various other combinations, modifications, and environments. That is, the present disclosure can be modified or changed within the scope of the concept of the present disclosure, the equivalent scope of the present disclosure, and/or the scope of the art or knowledge to which the present disclosure pertains. The present disclosure is for describing an optimum state for embodying the technological idea of the present disclosure and can be modified in various forms required in detailed application fields and uses. Accordingly, the detailed description of the present disclosure is not intended to limit the disclosure. In addition, it should be interpreted that the appended claims contain other exemplary embodiments.

FIG. 1 is a diagram showing a sensorless vector control system according to an exemplary embodiment of the present disclosure.

Referring to FIG. 1, a sensorless vector control system 1 may include a microcontroller (MCU) 100, an inverter unit 180, and a brushless direct current (BLDC) motor 200. The sensorless vector control system 1 may be used to detect whether the BLDC motor 200 stalls without a rotor position detection sensor, such as a hall sensor. Vector control refers to a method of controlling a velocity and torque via current control using a method of splitting current supplied to a stator into torque split current $i_q$ and magnetic flux split current $i_d$ and controlling the current. Since the sensorless vector control system 1 does not include a velocity control detection sensor, the sensorless vector control system 1 is not capable of receiving the actual velocity of the BLDC motor 200 as feedback, and thus, a value approximating the actual velocity may be estimated through a calculation operation of estimating the velocity via phase current of the BLDC motor 200 and may be compensated for to control the velocity and torque.

The MCU 100 may control the current supplied to the BLDC motor 200 to directly control the velocity and torque of the BLDC motor 200.

A velocity controller 10 may control the velocity of torque split current $i_{q*}$. In vector control, magnetic flux split current $i_{d*}$ may be constantly controlled, and thus, the velocity controller 10 may control only the torque split current $i_{q*}$.

To estimate an angle of a stator and a position of a rotor, counter electromotive force of the BLDC motor 200 may be used, and may be calculated by a first vector calculator 20. The first vector calculator 20 may estimate a magnetic flux angle through current supplied to the BLDC motor 200 from the inverter unit 180. In addition, the first vector calculator 20 may measure the current supplied to the BLDC motor 200 to estimate the mechanical angle of the BLDC motor 200. Estimation of the mechanical angle refers to estimation of a rotor position. Information on the magnetic flux angle and the electrical angle estimated through the first vector calculator 20 may be transmitted to a torque split current controller 30a and a magnetic flux current controller 30b.

A third vector calculator 60 may select two currents from 3-phase currents output from the inverter unit 180 to generate coordinate-transformed currents $I_\alpha$ and $I_\beta$. The coordinate system is a two-dimensional (2D) fixed coordinate system using fixed axes α and β as axes. The α axis and the β axis are orthogonal to each other, and the β axis precedes the α axis by 90°. The α axis is an axis that matches an axis (the U axis) corresponding to a U-phase winding. The third vector calculator 60 may perform a vector operation on the coordinate-transformed currents $I_\alpha$ and $I_\beta$ to generate a detected current value ($i_q$, $i_d$) using information such as 3-phase alternating current (AC) current supplied to the BLDC motor 200 and an estimated magnetic flux angle. The dq coordinate system is a 2D rotary coordinate system based on rotation axes d and q. In a rotary coordinate system that rotates at the same speed as the rotation speed of a magnetic flux formed by a permanent magnet of the BLDC motor 200, an axis based on a direction of the magnetic flux formed by the permanent magnet is the d axis, and an axis that precedes the d axis by a phase of 90° is the q axis.

The torque split current controller 30a may output new torque split current obtained by subtracting the detected current value $i_q$ calculated by the third vector calculator 60 from the torque split current $i_{q*}$. The magnetic flux current controller 30b may output new magnetic flux split current obtained by subtracting the detected current value id calculated by the first vector calculator 20 from the magnetic flux split current $i_{d*}$.

A second vector calculator 40 may derive a voltage of the d axis and a voltage of the q axis based on the new torque split current and the new magnetic flux split current that are transmitted from the torque split current controller 30a and the magnetic flux current controller 30b, and an estimated velocity value, etc. derived by the first vector calculator 20. The second vector calculator 40 may output a 3-phse AC voltage based on the voltage of the d axis, the voltage of the q axis, and the estimated magnetic flux angle.

A pulse width modulation unit (PWM) 50 may perform space vector pulse width modulation (SVPWM) based on the 3-phase AC voltage transmitted by the second vector calculator 40 to output a gating signal for on/off control of switching devices (not shown) of the inverter unit 180.

The inverter unit 180 may convert a DC voltage applied from a DC power source (not shown) into a 3-phase AC voltage and may apply the 3-phase AC voltage to the BLDC motor 200. For example, the DC power source (not shown) may be a 12V or 24V battery of an automobile. The 3-phase AC voltage supplied to the BLDC motor 200 by the inverter unit 180 may include U-phase, V-phase, and W-phase voltages indicating voltages applied to U-phase, V-phase, and W-phase armature windings.

The BLDC motor 200 may include a rotor and a stator. The rotor may include a permanent magnet and the stator may include a coil (electromagnet). The BLDC motor 200 may rotate the rotor at predetermined angular velocity according to the 3-phase voltage transmitted from the inverter unit 180. The angular velocity r. The rotor may inclmeasured by an encoder (not shown) connected to the rotor and may be transmitted to the first vector calculator 20.

Figure 2:
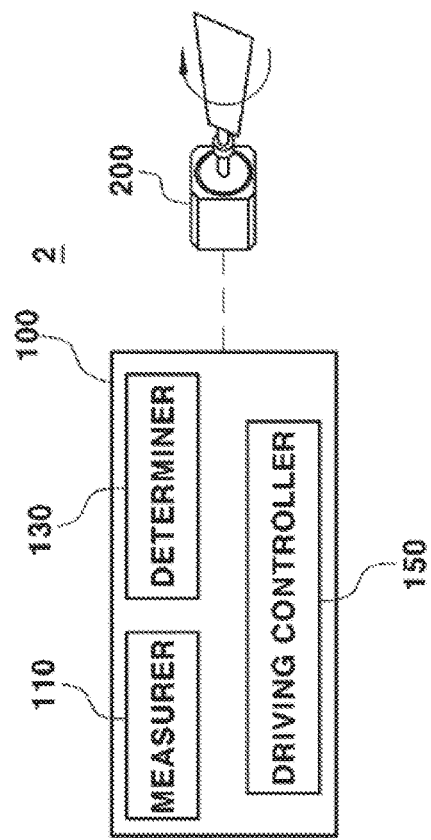
FIG. 2 is a block diagram of a brushless direct current (BLDC) motor overload detection apparatus according to an exemplary embodiment of the present disclosure.
Figure 3:
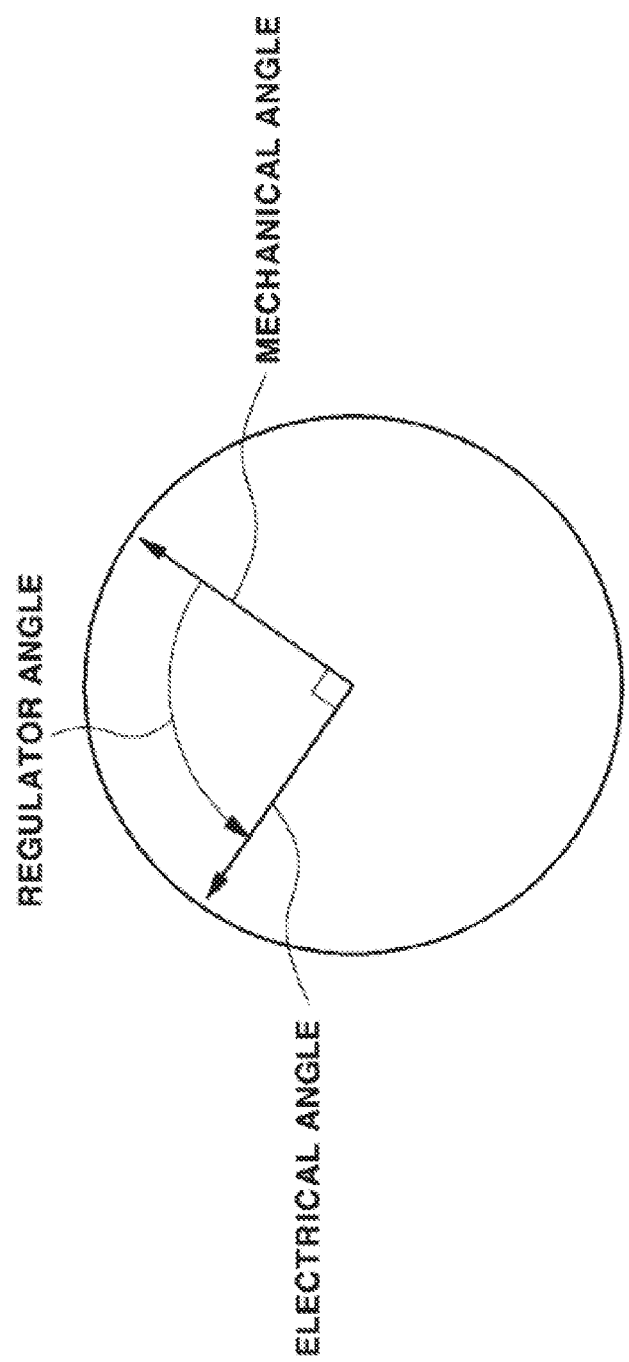
FIG. 3 is a diagram for explanation of a regulator angle of a BLDC motor according to an exemplary embodiment of the present disclosure.

FIG. 2 is a block diagram of a BLDC motor overload detection apparatus according to an exemplary embodiment of the present disclosure. FIG. 3 is a diagram for explanation of a regulator angle of a BLDC motor according to an exemplary embodiment of the present disclosure.

Referring to FIGS. 2 and 3, a BLDC motor overload detection apparatus 2 may include the MCU 100, including a measurer 110, a determiner 130, and a driving controller 150, and the BLDC motor 200, controlled by the MCU 100. In this case, the measurer 110, the determiner 130, and the driving controller 150 are defined to be differentiated according to the functions of the MCU 100. The BLDC motor overload detection apparatus 2 may be applied to various motors such as an ultrahigh speed motor for an electric turbocharger of an automobile, an electric supercharger, turbine generator, and an electric water pump.

The measurer 110 may measure an electrical angle of the BLDC motor 200. The electrical angle may be derived via size and phase comparison of 3-phase current supplied to the BLDC motor 200. For example, the measurer 110 may be a sort of current/voltage detector. The electrical angle may be maintained at 90 degrees with respect to a mechanical angle to maintain maximum torque of the BLDC motor 200 at ordinary time. However, the difference of the electrical angle with respect to the mechanical angle may not be 90 degrees when the BLDC motor 200 stalls. The mechanical angle may be an angle at which current supplied to the BLDC motor 200 is measured to estimate a position of a rotor. To maintain maximum torque of the BLDC motor 200, the electrical angle may have a phase that precedes the mechanical angle by 90 degrees. Such the difference between the electrical angle and the mechanical angle may be defined as a regulator angle.

The determiner 130 may determine whether the difference (regulator angle) between the electrical angle and the mechanical angle is within a predetermined range. The predetermined range may refer to upper and lower limits which are set based on a regulator angle for maintaining maximum torque of the BLDC motor 200. That is, the predetermined range may refer to upper and lower limits which are set based on 90 degrees. The predetermined range may be a value changed by a designer. When the difference between the electrical angle and the mechanical angle is out of the predetermined range, the determiner 130 may determine that an error occurs in the BLDC motor 200. However, the determiner 130 may not determine that the BLDC motor 200 stalls if a single error occurs in the BLDC motor 200. Here, stalling of the BLDC motor 200 may refer to the application of excessive load to the BLDC motor 200, and for example, may indicate the case in which the BLDC motor 200 does not output maximum torque due to a fault.

For example, the measurer 110 may repeatedly measure an electrical angle of the BLDC motor 200, and when a value obtained by adding an initialization value to the number of times an error occurs is greater than a predetermined threshold value, the determiner 130 may determine that the BLDC motor 200 stalls. The initialization value may refer to a value of cases in which an error does not occur even once. For example, the initialization value may refer to 0.

For example, when the number of times an error occurs in the BLDC motor 200 is counted and a value obtained by adding an initialization value to the number of times an error occurs is equal to or less than a predetermined threshold value, the measurer 110 may repeatedly measure the electrical angle. Accordingly, the determiner 130 may repeatedly determine the difference between the electrical angle and the mechanical angle to determine whether the BLDC motor 200 stalls.

The driving controller 150 may control driving of the BLDC motor 200. When the determiner 130 determines that the BLDC motor 200 stalls, the driving controller 150 may perform control such that a velocity value of the BLDC motor 200 is 0.

According to an exemplary embodiment of the present disclosure, without a separate rotor position detection sensor, 3-phase current supplied to the BLDC motor 200 may be measured to derive the mechanical angle of the BLDC motor 200, and the electrical angle may be measured to derive the regulator angle. The BLDC motor overload detection apparatus 2 may repeatedly measure a value of the regulator angle to recognize whether the BLDC motor 200 stalls.

Figure 4:
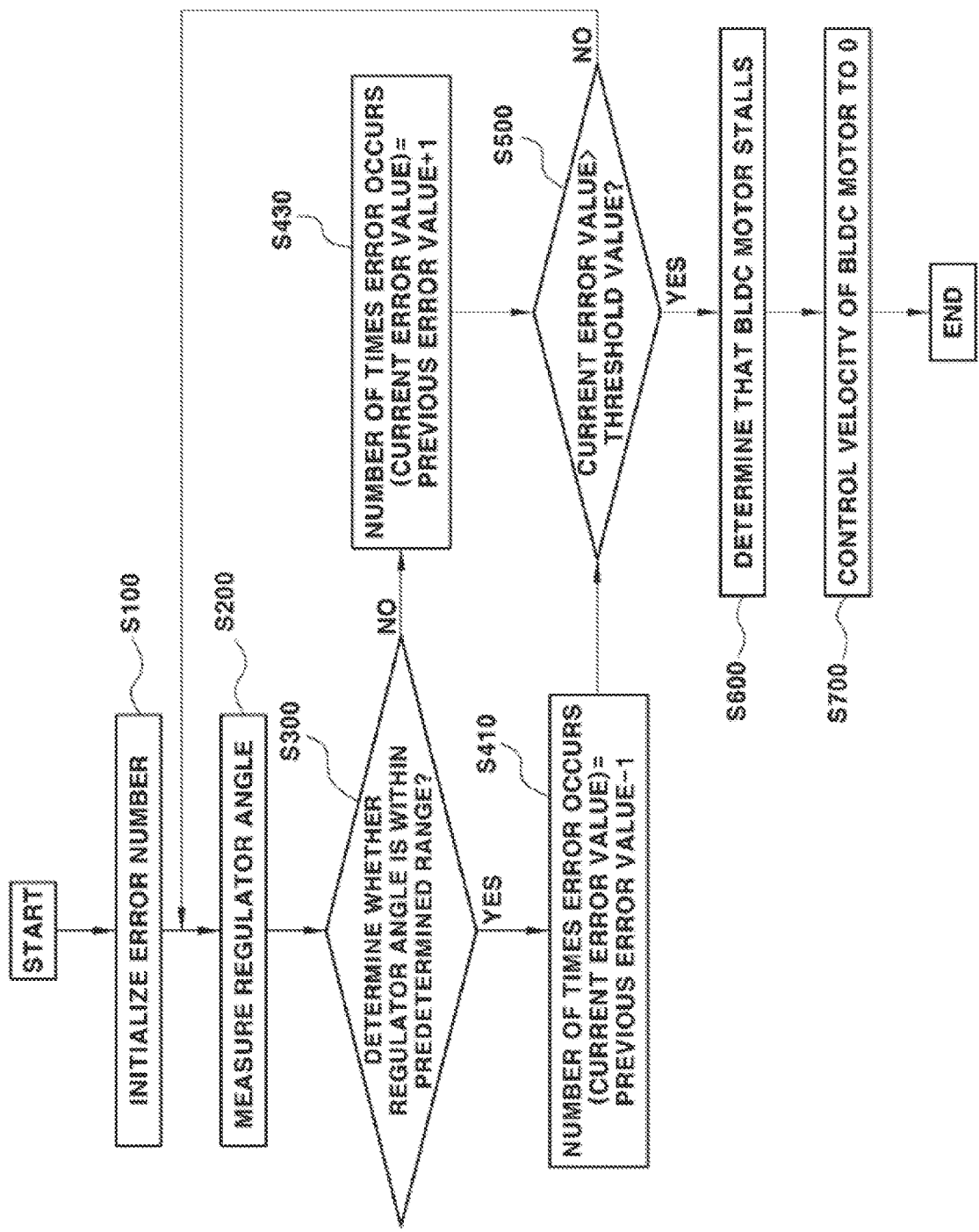
FIG. 4 is a flowchart for explanation of a BLDC motor overload detection method according to an exemplary embodiment of the present disclosure.

FIG. 4 is a flowchart for explanation of a BLDC motor overload detection method according to an exemplary embodiment of the present disclosure. For brevity of description, repeated portions of the description are omitted.

Referring to FIG. 4, the number of times an error occurs may be initialized based on the state in which the BLDC motor does not stall. That is, the number of times an error occurs may be set to 0 (S100).

The measurer may measure the electrical angle of the BLDC motor to derive the regulator angle. The regulator angle may be the difference between the electrical angle and the mechanical angle between the BLDC motor, and the mechanical angle may be estimated via a size and phase difference of 3-phase current supplied to the BLDC motor (S200).

The determiner may determine whether the regulator angle has a value within a predetermined range. The predetermined range may refer to upper and lower limits which are set based on 90 degrees (S300).

When the regulator angle has a value within the predetermined range, the determiner may determine that an error does not occur in the BLDC motor. The case in which the regulator angle has a value within the predetermined range may be defined as the case in which the BLDC motor is in a normal condition. In this case, the determiner may set a value obtained by subtracting a predetermined number from an initialization error value, to the current error value. When a previously determined error value is present, the determiner may set a value obtained by subtracting the predetermined number from the previous error value, to the current error value. In this case, the predetermined number may be changed by a designer (S410).

When the regulator angle has a value outside the predetermined range, the determiner may determine that an error occurs in the BLDC motor. The case in which the regulator angle has a value outside the predetermined angel may be defined as the case in which the BLDC motor is under a stall condition. The stall condition may indicate that an error occurs in the BLDC motor and may not indicate that the BLDC motor does not stall. In this case, the determiner may set a value obtained by adding an initialization error value and a predetermined number, to the current error value. When a previously determined error value is present, the determiner may set a value obtained by adding a previous error value and a predetermined number, to the current error value (S430).

The current error value may be changed depending on a value of the regulator angle. The determiner may determine whether the current error value is greater than a threshold value. When the current error value is equal to or less than the threshold value, the measurer may re-measure the regulator angle. That is, when the current error value is equal to or less than the threshold value, the determiner may not determine that the BLDC motor stalls even if an error occurs in the BLDC motor. In addition, until the current error value is greater than a threshold value, the measurer may repeatedly measure the regulator angle. In this case, driving of the BLDC motor may not be stopped (S500).

When the current error value is greater than the threshold value, the determiner may determine that the BLDC motor stalls (S600). When the determiner determines that the BLDC motor stalls, a driving controller may control the velocity of the BLDC motor to 0 (S700).

Figure 5:
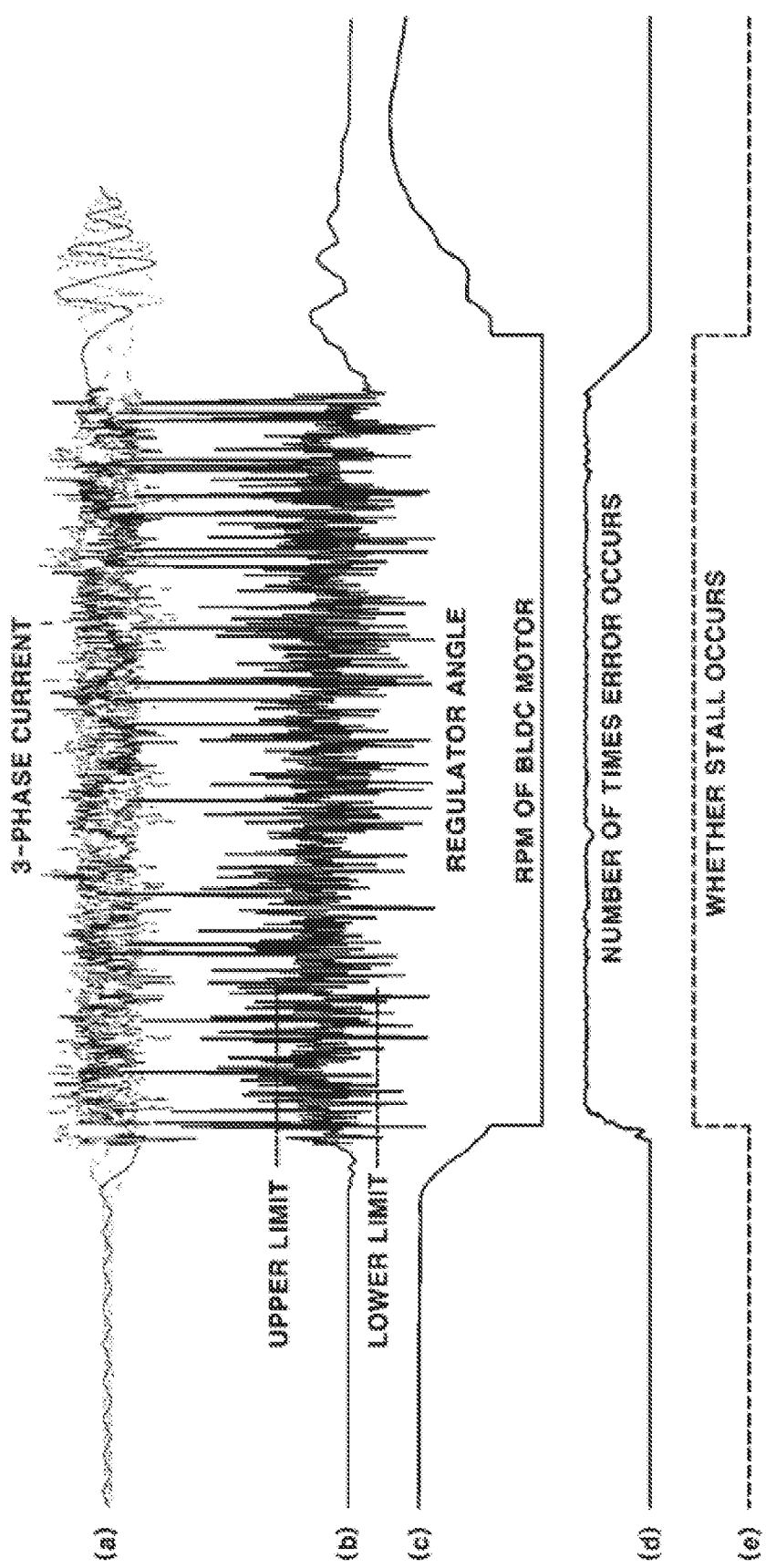
FIG. 5 is a diagram showing a waveform from which stalling of a BLDC motor is detected according to an exemplary embodiment of the present disclosure.

FIG. 5 is a diagram showing a waveform from which stalling of a BLDC motor is detected according to an exemplary embodiment of the present disclosure. In FIG. 5, (a) refers to 3-phase current supplied to the BLDC motor, (b) refers to a regulator angle, (c) refers to the number of revolutions per minute (RPM), which is the rotation velocity per minute of the BLDC motor, (d) refers to the number of times an error occurs in the BLDC motor, and (e) refers to whether the BLDC motor stalls.

Referring to FIGS. 2 and 5, when the BLDC motor 200 stalls, a phase current value applied to the BLDC motor 200 may be changed. As the width of a phase current value is increased, the regulator angle that is changed out of a predetermined range may be measured. Until the BLDC motor 200 stalls, the regulator angle may be maintained at 90 degrees. When the number of times error, in which the regulator angle is out of the predetermined range, occurs is greater than the threshold value, the determiner 130 may determine that the BLDC motor 200 stalls. Accordingly, the driving controller 150 may control RPM of the BLDC motor 200 to 0. Referring to lines (c), (d), and (e), when the BLDC motor 200 stalls, the RPM of the BLDC motor 200 may be reduced, and when the number of times an error occurs is greater than a threshold value, the RPM of the BLDC motor 200 may be controlled to 0.

According to an exemplary embodiment of the present disclosure, without a separate rotor position detection sensor, 3-phase current supplied to the BLDC motor may be measured to derive the mechanical angle of the BLDC motor, and the electrical angle may be measured to derive the regulator angle. The BLDC motor overload detection apparatus may repeatedly measure a value of the regulator angle to recognize whether the BLDC motor stalls.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. An apparatus for detecting overload of a brushless direct current (BLDC) motor, comprising:
   a measurer for measuring an electrical angle of the BLDC motor;
   a determiner for determining whether a difference between the electrical angle measured by the measurer and a mechanical angle of the BLDC motor, estimated through current supplied to the BLDC motor, is within a predetermined range; and
   a driving controller for control of driving of the BLDC motor according to whether the BLDC motor stalls, determined by the determiner;
   wherein the predetermined range is set based on 90 degrees;
   when the BLDC motor is in a normal condition, the difference between the electrical angle and the mechanical angle is maintained within the predetermined range; and
   when the BLDC motor is in a stall condition, the difference between the electrical angle and the mechanical angle is out of the predetermined range.

2. The apparatus of claim 1, wherein the determiner determines that an error occurs in the BLDC motor when the difference between the electrical angle and the mechanical angle is out of the predetermined range.

3. The apparatus of claim 2, wherein the determiner determines that the BLDC motor stalls when a value obtained by adding a number of times the error occurs to an initialization value is greater than a predetermined threshold value.

4. The apparatus of claim 2, wherein:
when the error occurs in the BLDC motor, the determiner counts a number of times the error occurs; and
when a value obtained by adding the number of times the error occurs to an initialization value is equal to or less than a predetermined threshold value, the determiner repeatedly determines whether the difference between the electrical angle and the mechanical angle is out of the predetermined range.

5. The apparatus of claim 4, wherein the determiner determines that the number of times the error occurs by subtracting a predetermined number from the initialization value when error does not occur in the BLDC motor.

6. The apparatus of claim 1, wherein, when the determiner determines that the BLDC motor stalls, the driving controller controls a velocity value of the BLDC motor to 0.

7. A method of detecting stall of a brushless direct current (BLDC) motor, the method comprising:
deriving a mechanical angle of the BLDC motor from a current value supplied to the BLDC motor;
measuring an electrical angle of the BLDC motor;
determining whether a difference between the mechanical angle and the electrical angle is within a predetermined range;
counting a number of times an error, in which the difference between the mechanical angle and the electrical angle is out of the predetermined range, occurs; and
determining whether the BLDC motor stalls based on the number of times the error occurs.

8. The method of claim 7, wherein the determining whether the BLDC motor stalls based on the number of times the error occurs includes determining that the BLDC motor stalls when the number of times the error occurs is equal to or greater than a predetermined threshold value.

9. The method of claim 7, wherein the determining whether the difference between the mechanical angle and the electrical angle is within the predetermined range includes:
determining that the BLDC motor is in a normal condition when the difference between the mechanical angle and the electrical angle is within the predetermined range, and determining that the BLDC motor is in a stall condition when the difference between the mechanical angle and the electrical angle is out of the predetermined range.

10. The method of claim 9, wherein the counting of the number of times error, in which the difference between the mechanical angle and the electrical angle is out of the predetermined range, occurs includes:
subtracting a predetermined number from a previous error value when the BLDC motor is in the normal condition; and
adding the predetermined number to the previous error value when the BLDC motor is in the stall condition.

11. The method of claim 10, wherein the determining whether the BLDC motor stalls based on the number of times the error occurs includes determining whether a current error value obtained by adding or subtracting the number of times the error occurs corresponding to a predetermined number to or from the previous error value is equal to or greater than the predetermined threshold value.

12. The method of claim 11, further comprising repeatedly measuring whether the difference between the electrical angle and the mechanical angle is out of the predetermined range when the current error value is equal to or less than the predetermined threshold value.

13. The method of claim 7, further comprising controlling a velocity of the BLDC motor to 0 upon determining that the BLDC motor stalls based on the number of times the error occurs.

* * * * *